Patented June 15, 1954

2,681,277

UNITED STATES PATENT OFFICE 2,681,277

HEAT SENSITIVE RECORDING ELEMENT

Montford Morrison, Rochester, N. Y.

No Drawing. Application January 28, 1953,
Serial No. 333,845

5 Claims. (Cl. 95—7)

This invention relates in general to heat sensitive recording elements which react to change color or react to develop color under the action of an alkaline substance, and specifically to a novel use of a compound for causing color change or development by heat in such papers.

The present application is a continuation-in-part of application Serial No. 300,350 filed July 22, 1952, which is a continuation-in-part of application 25,991, filed May 8, 1948, now abandoned. The present specification is limited to the exact text of the specification of application 25,991.

An object of the invention is to provide for alkali sensitive papers, a novel method of obtaining an alkaline reaction by the application of heat.

Another object of the invention is to provide for recording papers that are sensitive to ammonia, a novel means of obtaining ammonia therefor, or at least a novel means of obtaining a reaction which is equivalent to the results obtained with ammonia.

Another object of the invention is to provide a heat sensitive paper that does not react at climatic temperatures, and requires an elevated critical temperature to cause the desired reaction.

Another object of the invention is to provide a recording paper which develops in the entire absence of free moisture.

Another object is to provide a method of applying a second coating to a paper having a first coating, which will react with said second coating in a common solvent, by a process which prevents reaction between two said coatings when in normal contact at climatic temperatures.

In the prior art recording papers that employ an alkaline developer, moisture is required as a common solvent between the developer and the substance developed. In the present invention the reaction takes place at temperatures above the vaporization point of water and further, in general, the reaction is considerably slowed up and not highly satisfactory if there is considerable moisture initially present in the paper.

In the present invention urea is employed as the developing agent. The exact chemistry of urea involves many disputed points, even its composition has not been universally agreed upon (see Emil A. Warner, The Chemistry of Urea, Longmans, 1923).

The behavior of urea at elevated temperatures depends upon not only the temperature to which it is raised but also upon the rate at which it is raised.

Urea decomposes at elevated temperatures, but the decomposition products depend upon the circumstances of the decomposition.

However, the applicant has discovered that urea, when raised rapidly to temperatures around 150° C., will react with compounds as if ammonia were present, even in the absence of any substantial amount of moisture.

Whether, ammonia is liberated by the application of heat to urea and the liberated ammonia attacks ammonia-vulnerable compounds, or the reaction is directly between the heated urea and the compounds, it is not certain from the reactions except by speculation, since the applicant has found no independently detectable ammonia present, and certainly no trace of the odor of ammonia.

Some of the reactions that the applicant finds for heated urea are:

Mercurous chloride is blackened.
Ammonia-vulnerable dyes are developed.
Alkanin paper is changed from red to blue.
Tincture-of-blue-hyacinth paper turns green.
Yellow fuchsine paper turns red.
Diazo papers are developed. In fact such commercial positive printing-out papers, as is known by the names; Ozalid, Multazo and related papers may be developed by a stratum of suitably applied urea under the stimulus of heat.

The method of employing urea as a developer in accordance with the present invention, depends upon the substance to be developed. Also whether the substance is a soluble compound or a pigment which is employed in an undissolved state.

In employing the present invention to develop dyes in paper containing or having coatings of alkali developing dyes, the procedure is as follows:

The paper may be dyed or coated by any suitable method or process, for example, along the lines suggested in U. S. Patents Nos. 1,444,469; 1,628,279 or similar or equivalent processes, or coated paper may be purchased on the market, such as; Ozalid, Multazo or other papers which react similarly.

The above coated or dyed paper is then blasted with air at a temperature of about 60° C. to remove surface moisture, then coated by spraying it with the following solution:

| | |
|---|---|
| Water _____ c.c__ | 100 |
| Urea _____ grms__ | 20 |
| Gelatin _____ grm__ | 0.5 |

The spraying is done, preferably, with carbon dioxide gas and a multiplicity of layers of urea are applied, each spraying accompanied with a blast of air heated to about 60° C. to drive off all solution possible by the time the urea reaches the coating on the paper.

Urea in a water solution will react with ammonia-vulnerable water soluble dyes at room temperatures and the urea coating must be applied in such a way as to prevent any substantial amount of reaction due to water present.

When the urea coating is properly applied there is no perceptible reaction between the urea and the dye in their normal state of dryness, at climatic temperatures, over the useful life of the dye, which is not impaired by the presence of the urea stratum.

The above papers with the added stratum of urea, may be exposed through a print to light in the conventional way and either developed by ammonia by the conventional method, or they may be exposed through a print to light in the conventional way and then developed by the application of a non-reactive surface (chromium for instance) heated to a temperature of about 150° C. for one minute.

No odor of ammonia is detected from this paper during or immediately after development, which is not true in the case of ammonia development, in which case the odor of ammonia comes from the paper for some time after development.

As a further advantage, the urea stratum has the definite effect of increasing destruction of the dye during exposure to light, which makes the "time of exposure" considerably less than the time required in the absence of the urea stratum.

Obviously it is immaterial whether the urea stratum is above or below the dye, and therefore the urea may be put on or in the paper first, and then the dye applied in the same, or in an equivalent, manner as described for the application of the urea stratum.

As an alternate method of applying the urea stratum, a non-aqueous solution of urea may be applied instead of the aqueous solution given, following the same method of application or following an equivalent method.

One suitable non-aqueous solution of urea for the stratum is as follows:

| | | |
|---|---|---|
| Methyl alcohol | c. c. | 100 |
| Urea | grms. | 20 |

To the above solution may be added 1 grm. of 326 viscosity cellulose nitrate dissolved in 6.25 c. c. of ethyl alcohol and 18.75 c. c. of ether. This solution serves as a binder and the amount of binder used may be varied to obtain the most satisfactory results sought after.

Further, the cellulose nitrate seems to act as a preservative for the urea, since better shelf life is obtained when cellulose nitrate is used.

Further, when the dye is not alcohol soluble, there is less tendency for the urea to react with the dye during the period of application of the urea stratum.

Obviously any other ammonia-vulnerable or ammonia-developable compound may be used in place of the diazo compounds employed in the papers stated in the above examples.

As an example of the employment of the invention in making of a heat sensitive paper, such as may be used in electrical facsimile reception, the following formula is given:

| | | |
|---|---|---|
| Methyl alcohol | c. c. | 100 |
| Urea | grms. | 16 |
| Mercurous chloride | grms. | 20 |
| Cellulose nitrate solution | c. c. | 25 |

The cellulose nitrate solution is made by dissolving 2 grms. of 326 viscosity cellulose nitrate in 6.25 c. c. of ethyl alcohol and 18.75 c. c. of ether.

To employ the above formula, the urea is dissolved in the methyl alcohol, into which the mercurous chloride is put, and then the cellulose nitrate solution is added.

The final mixture is put into a glass ball mill, with glass balls, and the mixture milled for about 75 hours, in the manner commonly used in the lacquer industry for mixing pigmented lacquer in commercial ball mills.

While other methods of mixing may be employed the all-glass ball mill contains nothing that will react with the ingredients and further with round glass balls, less material is contributed from the balls to the mixture, than with flint pebbles as are sometimes used in these mills.

After milling the above mixture is coated on a suitable support, usually paper, by any suitable coating process, usually such as is used in coating photographic papers. The applicant uses the so-called "wiping process" of coating. The paper is then ready for recording by the application of heat from any source whatever, such as, for instance, a heated object or a heated stylus, or by the heat generated by a spark or by the conduction of electric current through the coating, all of which is well understood in the electrical recording art.

Recording paper properly made in accordance with the above directions, gives a pure white surface which is perfectly stable over years of shelf life. The record is intensely black and permanent.

The expression "ammonia-vulnerable compound" is used herein to mean any compound or mixture of compounds that will react with ammonia, either to change color or to develop a color.

The expression "heat sensitive coating" is used herein to mean a coating that is sensitive to heat as one reaction and may be sensitive to other things also. The first given coating is sensitive to light, direct application of ammonia as well as to other things, besides being sensitive to heat.

The expression "coating" is used herein to include "dyeing" in which process some of the dye is within the support as well as on the surface thereof.

The expression "dye" is used herein to mean any compound or mixture of compounds which will change color or develop color under reaction with a developing agent.

What is claimed:

1. A heat sensitive recording element comprising mercurous chloride and urea.

2. A heat sensitive recording element comprising a support having a coating containing a mixture of mercurous chloride and urea.

3. A heat sensitive recording element comprising a support having a coating containing a mixture of mercurous chloride and urea dispersed in a binder.

4. A heat sensitive recording element comprising a support having a coating containing a mixture of mercurous chloride and urea dispersed in a binder containing a cellulose derivative.

5. A heat sensitive recording element comprising a support having a coating containing a mixture of mercurous chloride and urea dispersed in a binder containing an organic-liquid soluble cellulose derivative.

References Cited in the file of this patent

UNITED STATES PATENTS

| Number | Name | Date |
|---|---|---|
| 1,844,199 | Bicknell et al. | Feb. 9, 1932 |
| 2,336,299 | Russell | Dec. 7, 1942 |